United States Patent
Eo et al.

(10) Patent No.: US 9,574,620 B2
(45) Date of Patent: Feb. 21, 2017

(54) CLUTCH FOR VEHICLE

(71) Applicant: Hyundai Motor Company, Seoul (KR)

(72) Inventors: Soon Ki Eo, Ansan-si (KR); Chon Ok Kim, Yongin-si (KR); Ki Jong Park, Osan-si (KR); Dong Won Kim, Osan-si (KR)

(73) Assignee: Hyundai Motor Company, Seoul (KR)

( * ) Notice: Subject to any disclaimer, the term of this patent is extended or adjusted under 35 U.S.C. 154(b) by 83 days.

(21) Appl. No.: 14/562,257

(22) Filed: Dec. 5, 2014

(65) Prior Publication Data

US 2016/0084324 A1    Mar. 24, 2016

(30) Foreign Application Priority Data

Sep. 18, 2014    (KR) .................... 10-2014-0124312

(51) Int. Cl.
*F16D 23/14*    (2006.01)
*F16D 13/58*    (2006.01)

(52) U.S. Cl.
CPC .......... *F16D 13/583* (2013.01); *F16D 23/143* (2013.01)

(58) Field of Classification Search
CPC ...... F16D 13/583; F16D 23/143; F16D 23/14; F16D 23/148
See application file for complete search history.

(56) References Cited

U.S. PATENT DOCUMENTS 5,715,921 A * 2/1998 Link .................... F16D 13/583
192/111.2

FOREIGN PATENT DOCUMENTS

| JP | 3715660 B2 | 9/2005 |
|---|---|---|
| KR | 1996-0021763 A | 7/1996 |
| KR | 20-1998-031644 U | 8/1998 |
| KR | 10-2006-0025059 A | 3/2006 |
| KR | 10-2009-0072421 A | 7/2009 |
| KR | 10-2012-0061829 A | 6/2012 |
| KR | 10-2012-0108231 A | 10/2012 |

* cited by examiner

*Primary Examiner* — Huan Le
(74) *Attorney, Agent, or Firm* — Morgan, Lewis & Bockius LLP

(57) ABSTRACT

A clutch for a vehicle may include a pressing member configured to interwork with a clutch pedal and move in one direction when the clutch pedal is stepped on; and an elastic member having an end portion in contact with the pressing member, and configured to apply elastic force to the pressing member in the other direction when the pressing member moves in one direction, and exert elastic force in one direction when the pressing member passes through a preset point to restrain the pressing member from being restored to its original condition.

5 Claims, 2 Drawing Sheets

CLUTCH FOR VEHICLE

CROSS REFERENCE TO RELATED APPLICATION

The present application claims priority of Korean Patent Application Number 10-2014-0124312 filed on Sep. 18, 2014, the entire contents of which application are incorporated herein for all purposes by this reference.

BACKGROUND OF THE INVENTION

Field of the Invention

The present invention relates to a clutch for a vehicle and, more particularly, to a clutch for a vehicle that may be maintained in a connected or disconnected state even when a clutch pedal is released.

Description of Related Art

In general, in automatic transmission vehicles, power output from an engine is transmitted to an automatic transmission by the medium of a torque converter, and the power-received automatic transmission joins or disconnects a plurality of clutch disks to implements various transmission levels.

The use of the torque converter is to absorb transmission impact that may be generated when an engine and a transmission are directly connected like a manual transmission, and a fluid included in the torque converter enables power transmission in a non-direct connection state with an engine.

However, for this reason, power is lost in the process of power transmission, and thus, a dual-clutch transmission (DCT) using a plurality of clutches obtaining all the advantages of a clutch of a manual transmission, while reducing transmission impact when a speed is changed was developed and has been applied to some types of vehicles.

The DCT uses a plurality of clutches, generally, two clutches, and clutches respectively used for even numbered gears and odd numbered gears are alternately connected to suppress impact generation when a speed is changed and minimize loss in power transmission.

However, in the DCT, while any one of the two clutches is maintained to be connected, the other should be disconnected, and here, in order to maintain the connected or disconnected state, hydraulic pressure should be continuously applied to the clutches, degrading fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a clutch for a vehicle that may be maintained in a connected or disconnected state even though hydraulic pressure is not continuously provided.

According to an exemplary embodiment of the present invention, there is provided a clutch for a vehicle, including: a pressing member configured to interwork with a clutch pedal and move in one direction when the clutch pedal is stepped on; and an elastic member having an end portion in contact with the pressing member, and configured to apply elastic force to the pressing member in the other direction when the pressing member moves in one direction, and exert elastic force in one direction when the pressing member passes through a preset point to restrain the pressing member from being restored to its original condition.

The pressing member may be a release bearing. The elastic member may be a diaphragm spring.

The elastic member may have a first rising section in which elastic force thereof exerting on the pressing member in the other direction increases as the pressing member moves in one direction, a falling section in which elastic force in the other direction is reduced, and a second rising section in which elastic force in the other direction increases.

An increment of elastic force in the first rising section according to the movement of the pressing member in one direction may be smaller than a decrement of elastic force in the falling section.

After the elastic force of the elastic member is reduced by an amount equal to the increment of elastic force in the first rising section, in the falling section, according to the movement of the pressing member in one direction, the elastic member may start to exert elastic force in one direction.

An inner circumferential portion and an outer circumferential portion of the elastic member in contact with the pressing member may form an initial slope, and the initial slope may be set such that an increment of elastic force in the first rising section is smaller than a decrement of elastic force in the falling section.

The clutch may further include an actuator configured to press the end portion of the elastic member in the other direction.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
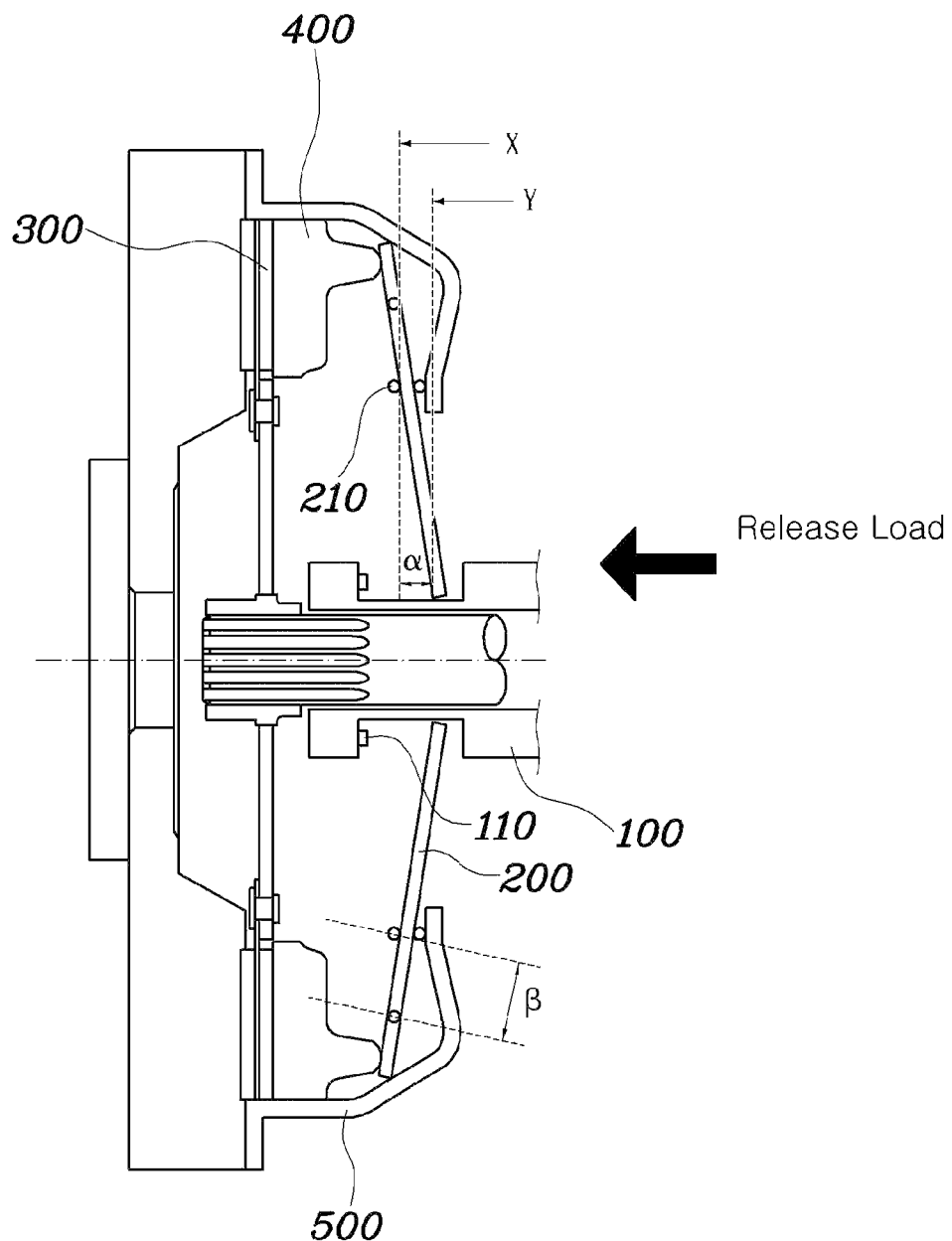
FIG. 1 is a view illustrating a configuration of a clutch for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a clutch for a vehicle according to an exemplary embodiment of the present invention will be described with reference to the accompanying drawings.

FIG. 1 is a view illustrating a configuration of a clutch for a vehicle according to an exemplary embodiment of the present invention. The clutch for a vehicle according to an exemplary embodiment of the present invention includes a pressing member 100 configured to interwork with a clutch pedal and move in one direction when the clutch pedal is stepped on, and an elastic member 200 having one end portion in contact with the pressing member 100 and configured to apply elastic force to the pressing member 100 in the other direction when the pressing member 100 moves in one direction, exert elastic force in one direction when the pressing member 100 passes through a preset point to restrain the pressing member 100 from being restored to its original condition.

In detail, the pressing member 100 may be a release bearing, and the elastic member 200 may be a diaphragm spring.

An inner circumferential portion of the elastic member 200 may be connected to a pressing plate 400 pressing a clutch disk 300 and an outer circumferential portion of the elastic member 200 is in contact with one end portion of the pressing member 100. A support portion 210 serving as a lever is provided on the inner circumferential portion of the elastic member 200, whereby when the outer circumferential portion of the elastic member 200 is pressed, the inner circumferential portion of the elastic member 200 may move in the opposite direction of the pressing direction. The support portion 210 may be fixed to a housing 500 connected to a vehicle body and may be formed as a pin or a protrusion.

Usually, the inner circumferential portion of the elastic member 200 presses the pressing plate 400 to make and the pressing plate 400 press the clutch disk 300, maintaining the clutch disk 300 in a connected state. When the pressing member 100 moves in one direction, the pressing plate 400 is released from the clutch disk 300, thus inducing the clutch disk 300 to be disconnected.

However, conversely, it may also be configured such that the inner circumferential portion of the elastic member 200 is separated from the pressing plate 400, making the pressing plate 400 released from the clutch disk 300, maintaining the clutch disk 300 in a disconnected state, and when the pressing member 100 moves in one direction, the pressing plate 400 joins the clutch disk 300, thus inducing the clutch disk 300 to be connected.

In the present exemplary embodiment, the case in which the clutch disk 300 is usually in a connected state is described, but the opposite scenario as mentioned above may also be applied.

In an exemplary embodiment of the present invention, clutches of a dual-clutch transmission (DCT) may be used, and in the present exemplary embodiment, one of a plurality of clutches used in the DCT will be described. The clutch for a vehicle according to an exemplary embodiment of the present invention may not necessarily used in only the DCT but may also be used in a manual transmission vehicle and, besides, the clutch according to an exemplary embodiment of the present invention may be used in various exemplary embodiments without departing from the scope of the technical concept of the present invention.

Figure 2:
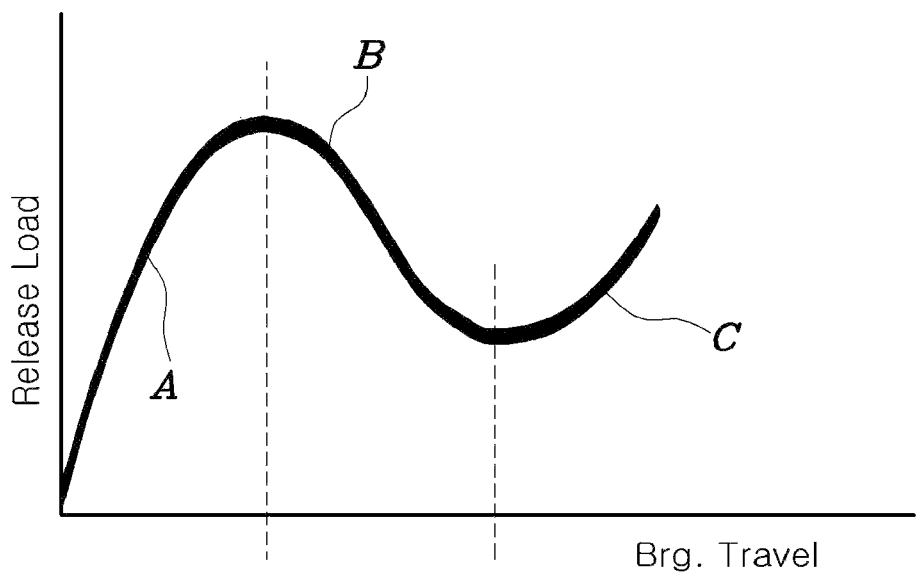
FIG. 2 is a view illustrating characteristics of an elastic member of the clutch for a vehicle according to the exemplary embodiment of the present invention.

FIG. 2 is a view illustrating characteristics of the elastic member 200 of the clutch for a vehicle according to the exemplary embodiment of the present invention. As mentioned above, the elastic member 200 may be a diaphragm spring. Thus, the elastic member 200 may have elastic characteristics of a diaphragm spring. FIG. 2 illustrates a change in a load applied to the elastic member 200 according to a movement of the pressing member 100 in one direction, in which elastic restoring force of the pressing member 100 in the other direction increases according to movement of the pressing member 100 in one direction in a first rising section (A), elastic restoring force of the pressing member 100 in the other direction is reduced in a falling section (B), and elastic restoring force of the pressing member 100 in the other direction increases again in a second rising section (C).

Preferably, the elastic member 200 may have an inner circumferential portion set to be sloped to face in the other direction initially according to experimentation. While the external circumferential portion of the elastic member 200 is moving together with the pressing member 100, the falling section (B) starts from the pre-set point, and here, the falling section (B) may occur due to the characteristics of the diaphragm spring when the inner circumferential portion and the outer circumferential portion of the elastic member 200 are level with each other.

Thereafter, when the pressing member 100 keeps moving in one direction, the inner circumferential portion of the elastic member 200 is reversely sloped to face in one direction, and when it is impossible for the inner circumferential portion of the elastic member 200 to move any longer, the second rising section (C) may appear.

The size of the first rising section (A) may vary depending on an initial height variation (a) between the position of the inner circumferential portion of the elastic member 200 at a point X where the inner circumferential portion and outer circumferential portion of the elastic member 200 are level with each other and a position of the inner circumferential portion of the elastic member 200 at an initial position Y of the elastic member 200 before the pressing member 100 is pressed. Here, as the initial height variation (a) is greater, the elastic member 200 may accumulate more elastic energy according to a movement of the pressing member 100 in one direction, further increasing the first rising section (A), and in a case in which the first rising section (A) is greater than a decrement of the falling section, when the pressing member 100 is released, the inner circumferential portion of the elastic member 200 may be returned to its initial position by the elastic restoring force.

Figure 3:
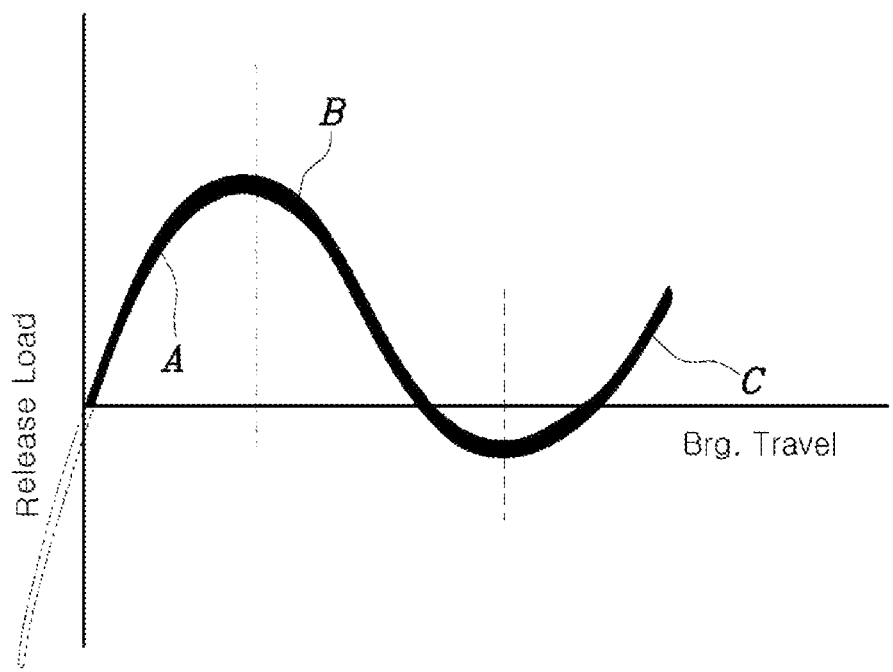
FIG. 3 is a view illustrating elastic characteristics of the clutch for a vehicle according to the exemplary embodiment of the present invention.

FIG. 3 is a view illustrating elastic characteristics of the clutch for a vehicle according to the exemplary embodiment of the present invention. The initial height variation (a) is set such that an increment of the first rising section (A) according to a movement of the pressing member 100 in one direction is smaller than a decrement of the falling section (B) by using the elastic characteristics of the elastic member 200, whereby, when the pressing member 100 moves in one direction, after the elastic force of the elastic member is reduced in the falling section (B) by an amount equal to the increment in the first rising section (A), the elastic member 200 may start to exert elastic force in one direction.

In this case, elastic restoring force of the elastic member 200 in the other direction is absent, and the inner circumferential portion of the elastic member 200 is maintained to be sloped in one direction, and in this case, even though the movement of the pressing member 100 in one direction is stopped by releasing the pressing of the clutch pedal, the elastic member 200 supports the pressing plate 400 such that the outer circumferential portion thereof is maintained to be separated from the pressing plate 400.

In order to set the initial height variation (a), an initial slope of the inner circumferential portion and the outer circumferential portion of the elastic member 200 may be set through experimentation, or a distance (($3$)) between the outer circumferential portion of the elastic member 200 and the support portion 210 of the elastic member 200 may be set through experimentation. Here, various exemplary embodiments may be implemented.

A stopper for limiting a movement of the pressing member 100 may be further provided to enable the elastic member 200 to be maintained with elastic force in one direction.

Also, an actuator 110 applying a load to the inner circumferential portion of the elastic member 200 in the other direction may be further provided to restore the elastic member 200 to the original initial position. The actuator 110 may be a cylinder in which a piston is operated by hydraulic pressure or pneumatic pressure, or may have a structure operated according to a rotation of a motor to be protruded or rotated to press the inner circumferential portion of the elastic member 200. The actuator 110 may be variously implemented. The actuator 110 may have an operating switch and may be installed in one end portion of the housing 500 or the pressing member 100.

According to the clutch for a vehicle having the structure as described above, since the clutch is maintained in a connected or disconnected state even though hydraulic pressure is not continuously applied when the clutch is connected or disconnected, a degradation of fuel efficiency according to supply and maintaining of hydraulic pressure can be prevented.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch for a vehicle, the clutch comprising:
   a pressing member configured to interwork with a clutch pedal wherein the pressing member move in a first direction when the clutch pedal is stepped on; and
   an elastic member having a first end portion slidably in contact with the pressing member, and configured to apply a first elastic force to the pressing member in a second direction when the pressing member moves in the first direction, and exert a second elastic force in a third direction when the pressing member passes through a preset point to restrain the pressing member from being restored to an original condition thereof by itself, while pressing of the clutch pedal is released.

2. The clutch of claim 1, wherein the pressing member is a release bearing.

3. The clutch of claim 1, wherein the elastic member is a diaphragm spring.

4. The clutch of claim 1, wherein an inner circumferential portion and an outer circumferential portion of the elastic member in contact with the pressing member form an initial slope, wherein the initial slope is set such that the elastic force apply to the pressing member in the second direction.

5. The clutch of claim 1,
   wherein the pressing member includes a groove formed along a longitudinal direction of the pressing member,
   wherein the first end portion of the elastic member selectively slides in the groove of the pressing member and a second end portion of the elastic member is coupled to a housing, and
   wherein a supporting portion is positioned between the first and second end portions of the elastic member and configured to engage a portion of the elastic member to the housing.

* * * * *